United States Patent
Sato et al.

(10) Patent No.: US 7,142,363 B2
(45) Date of Patent: Nov. 28, 2006

(54) DIFFRACTION ELEMENT AND OPTICAL DEVICE

(75) Inventors: Hiromasa Sato, Koriyama (JP); Hirotaka Nashi, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/223,936

(22) Filed: Sep. 13, 2005

(65) Prior Publication Data

US 2006/0001972 A1  Jan. 5, 2006

Related U.S. Application Data

(63) Continuation of application No. PCT/JP04/03305, filed on Mar. 12, 2004.

(30) Foreign Application Priority Data

Mar. 13, 2003 (JP) .............. 2003-068214
Mar. 20, 2003 (JP) .............. 2003-078133

(51) Int. Cl.
*G02B 5/18* (2006.01)
(52) U.S. Cl. ............ 359/569; 359/576; 356/328; 398/43
(58) Field of Classification Search ........... 359/569, 359/576, 566; 356/328; 398/43
See application file for complete search history.

(56) References Cited

U.S. PATENT DOCUMENTS

| | | | | |
|---|---|---|---|---|
| 6,191,890 | B1 * | 2/2001 | Baets et al. ............... | 359/572 |
| 6,445,456 | B1 * | 9/2002 | Speckbacher et al. ....... | 356/499 |
| 2001/0040716 | A1 * | 11/2001 | Itoh et al. ............... | 359/241 |
| 2001/0046055 | A1 | 11/2001 | Speckbacher et al. | |
| 2004/0169791 | A1 * | 9/2004 | Nilsen et al. .............. | 349/96 |
| 2004/0247010 | A1 * | 12/2004 | Okada et al. .............. | 372/102 |

FOREIGN PATENT DOCUMENTS

| JP | 1-213599 | 8/1989 |
|---|---|---|
| JP | 5-27108 | 2/1993 |
| JP | 8-334609 | 12/1996 |
| JP | 11-183249 | 7/1999 |
| JP | 2001-59773 | 3/2001 |
| JP | 2002-540446 | 11/2002 |

OTHER PUBLICATIONS

U.S. Appl. No. 11/256,053, filed Oct. 24, 2005, Sato et al.
U.S. Appl. No. 11/223,936, filed Sep. 13, 2005, Sato et al.
Lopez A G: "Wave-Plate Polarizing Beam Splitter Based on a Form-Birefringent Multilayer Grating," Optics Letters, Osa, Optical Society of America, Washington, DC, US, vol. 23, No. 20, Oct. 15, 1998, pp. 1627-1629.
Brundrett D L et al: "Polarizing Mirror/Absorber for for Visible Wavelengths Based on a Silicon Subwavelength Grating: Design and Fabrication," Applied Optics, Osa, Optical Society of America, Washington, DC, US, vol. 37, No. 13, May 1, 1998, pp. 2534-2541.

* cited by examiner

*Primary Examiner*—Fayez G. Assaf
(74) *Attorney, Agent, or Firm*—Oblon, Spivak, McClelland, Maier & Neustadt, P.C.

(57) ABSTRACT

A diffraction element having high diffraction efficiency and large wavelength-separation effect, which is excellent in mass-productivity and is formed by a simple process, is obtained. In a diffraction element having a rectangular grating formed in a surface of a transparent substrate whose cross-section is of an alternating recessed and projecting shape and each of the projecting portions is symmetrical, the period of the grating is equal to or smaller than the wavelength of incident light and the diffraction element is adopted so that the light is incident obliquely to its surface where the grating is formed.

16 Claims, 7 Drawing Sheets

DIFFRACTION ELEMENT AND OPTICAL DEVICE

TECHNICAL FIELD

The present invention relates to a diffraction element and an optical device, in particular, to a spectrometry device, and in more detail, to a diffraction element for changing the output direction of light depending on the wavelength, which is to be used for optical multiplex communication or spectrophotometry, and to a spectrometry device employing the diffraction element.

BACKGROUND ART

There is a method of diffracting light having various wavelengths into different directions to separate the light depending on the respective wavelengths, and measuring the intensity of each of the separated light to determine the intensity of light of various wavelengths contained in the incident light. Here, in order to utilize the separated light with good efficiency, it is preferred that a diffracted light is efficiently concentrated on a specific diffraction order, and as the method for the wavelength separation, a method of employing a diffraction element having a saw-tooth-like cross section is known.

In order to increase the angle between the incident light and the diffracted light to increase the flexibility in disposing optical elements, it is preferred to use a transmission type diffraction grating. FIG. 7 shows a conventional transmission type diffraction grating employing a resin. The diffraction element is formed by the following method. Namely, by pressing a mold, not shown, having a straight saw-tooth-form diffraction grating precisely formed therein, against a photo-sensitive resin 702 deposited on a surface of a glass substrate as a transparent substrate 701, curing the photo-sensitive resin 702 with UV light, and separating the mold from the resin to form a saw-tooth-form diffraction grating 703, whereby a transmission type saw-tooth-like diffraction element 70 is obtained.

Further, FIG. 8 shows an example of a transmission type pseudo-saw-tooth-like diffraction grating whose saw-tooth-form is approximated by steps. The pseudo-saw-tooth-like diffraction grating 802 is formed by repeating a photolithography method and an etching method to a surface of a glass substrate as a transparent substrate 801, and the diffraction grating is used as a diffraction element 80 of transmission type having a pseudo-saw-tooth form.

Here, an arrow mark of solid line shows incident light, an arrow mark of dashed line shows transmission light, and an arrow mark of broken line shows the −1st order diffraction light.

In the above conventional example, in order to obtain a high diffraction efficiency with a transmission type saw-tooth-like diffraction grating, it is necessary that the phase difference defined as a product of the refractive index difference between the grating material and output-side medium such as an air, multiplied by the depth of the grating, is determined to be about the wavelength of light. Meanwhile, the period of the grating is preferably small to increase the separation angle depending on wavelength. For these reasons, the shape of the saw-tooth-form diffraction grating has to be such that the period of grating is small and the aspect ratio (D/T) defined as the ratio of the grating depth D to the grating period T, is large.

DISCLOSURE OF THE INVENTION

However, a saw-tooth-form diffraction grating having a large aspect ratio is difficult to produce, and when it is produced with a resin, there are problems such as limitation in producing a mold, transferring capability to the resin or separation capability of the resin from the mold. Thus, there has been a problem that a diffraction grating having a large separation performance depending on the wavelength required and having a high utilization efficiency of light, can not be obtained with high productivity at low cost.

Further, when a resin material is employed, there has been a problem of reliability such as deterioration of the element under high temperature or high temperature and high humidity, and thus there has been a problem that the element can be used only under limited environmental conditions.

On the other hand, with respect to the pseudo-saw-tooth form diffraction grating, although the grating excellent in reliability and productivity at low cost can be produced in a large quantity, it is necessary to form such a pseudo-saw-tooth-like diffraction grating to have further fine steps in the period. Accordingly, there has been a problem that it is difficult to produce an element having a short period. Further, the variation of shape due to the error in production process significantly deteriorates the property, and thus, there has been a problem that a diffraction grating having a high light-utilization efficiency can not be produced at high yield.

In both of these conventional examples, in a case where the grating is used for 0 degree incidence (incidence perpendicular to the element surface), it is known that the diffraction efficiency significantly decreases when the period of the grating is about twice as large as the wavelength. Accordingly, there has also been a problem that it is difficult to satisfy high diffraction efficiency and large separation of light depending on wavelength by shortening the period (such as about twice) at the same time.

The present invention has been made under the above circumstances, and it is an object of the present invention to provide a diffraction element having high utilization efficiency of light, providing large separation depending on wavelength, being excellent in flexibility of disposing optical elements, suitable for mass production and excellent in reliability and temperature property.

The present invention provides a diffraction element comprising a grating formed in a substrate surface or a layer formed on a substrate, the grating having an alternating recessed and projecting shape in cross section, the upper surface of a projecting portion being substantially flat and the projecting portion being symmetrical, wherein the grating of the diffraction element is formed with a period substantially equal to the wavelength of incident light, and the diffraction element is adapted so that light is incident obliquely to its surface where the grating is formed.

Further, the present invention provides the diffraction element, wherein in the proportion of a projecting portion to a recessed portion in one period in the grating, the proportion of the projecting portion is equal to or larger than the proportion of the projecting portion.

Further, the present invention provides the diffraction element, wherein the wall surfaces of the projecting portion of the grating are inclined, and the proportion of the upper end of the projecting portion of the grating in one period is equal to or smaller than the proportion of the bottom portion of the projecting portion.

Further, the present invention provides the diffraction element, wherein at least one layer of an optical material different from the material for the projecting portion is laminated on at least the projecting portion.

Further, the present invention provides the diffraction element, wherein the optical material is one selected from $TiO_2$, $SiO_2$, $Ta_2O_5$ or $Al_2O_3$.

Further, the present invention provides the diffraction element, wherein a transparent substrate is used for the substrate; projecting portions of the grating are formed in a layer formed on the transparent substrate, and the projecting portions of the grating have a higher refractive index than the transparent substrate.

Further, the present invention provides the diffraction element, wherein the layer formed on the transparent substrate is the layer comprising one selected from the group consisting of $SiO_2$, $TiO_2$, $Ta_2O_5$, $Si_3N_4$ and Si as the major component or a mixture thereof.

Further, the present invention provides the diffraction element comprising another optical element laminated integrally on a surface of the diffraction element.

Further, the present invention provides a method of use of a diffraction element which comprises a grating formed in a substrate surface or a layer formed on a substrate, the grating having an alternating recessed and projecting shape in cross section, the upper surface of a projecting portion being substantially flat and the projecting portion being symmetrical, wherein the grating of the diffraction element is formed with a period substantially equal to the wavelength of incident light, and the diffraction element is adapted so that light is incident obliquely to its surface where the grating is formed.

Further, the present invention provides the method of use of a diffraction element, wherein the incident angle of obliquely incident light is in a range of from 15 to 80° with respect to the normal set on the surface of the diffraction element.

Further, the present invention provides an optical device in which the diffraction element is used.

Further, the present invention provides a spectrometry device comprising the optical device wherein a transparent substrate is used as the substrate of the diffraction element and the diffraction element is used as a transmission type element.

BEST MODE FOR CARRYING OUT THE INVENTION

Figure 1:
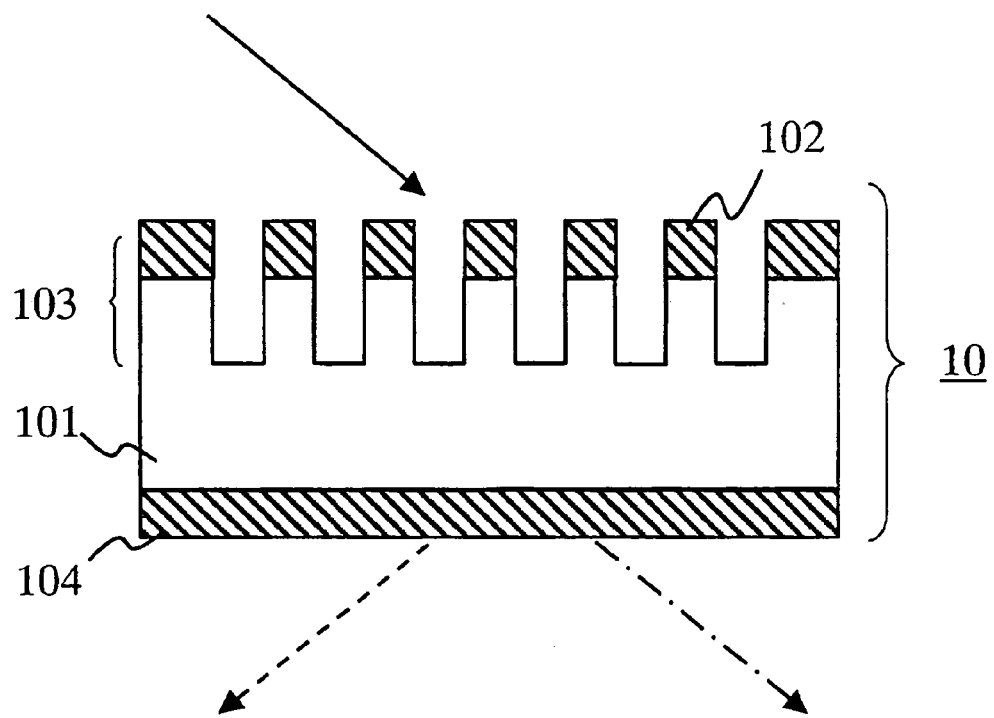
FIG. 1 is a side view showing an example of the construction of the diffraction element of the present invention.

The present invention relates to a diffraction element formed in a surface of a substrate and having a cross-section of alternating recessed and projecting form whose projecting portions are symmetrical, wherein the period of the grating is equal to or smaller than the wavelength of incident light. Further, the diffraction element is adapted to be used so that light is incident obliquely to its surface where the grating is formed.

Further, the grating having a cross-section of alternating recessed and projecting form may be formed in a layer formed on the substrate. The material for the layer formed on the substrate is preferably one excellent in etching property, and such material containing $SiO_2$, $TiO_2$, $Ta_2O_5$, $Si_3N_4$, Si or the like as the main component, or a mixed film of these materials may be used. By thus constructing the diffraction element, a diffraction element excellent in mass-productivity having a high diffraction efficiency and a large wavelength-separation effect can be realized with simple process. Since the diffraction element has a large wavelength-separation effect, it is preferably used as a diffraction grating for spectrometry.

Here, "the period of a grating is substantially equal to the wavelength of incident light" means that the period is within ±45% with respect to the wavelength of incident light. Namely, the period is within a range of from 0.55 to 1.45 times as large as the wavelength. When the period is within ±45%, only a specific diffraction light is generated by appropriately selecting the incident angle, and the effect of the present invention is not deteriorated. Further, "light is incident obliquely to its surface where the grating is formed" means that the angle is from 15 to 80° with respect to a normal line set on the surface of the element, and in particular, the angle of from 25 to 65° provides sufficiently the effect of the present invention.

The symmetrical cross-sectional shape of the projecting portion of the alternating recessed and projecting of the diffraction grating, may be rectangular, trapezoidal or the like, and any of these cross-sectional shape of the projecting portion provides the effect of the present invention. However, one having a shape close to a rectangle is preferred from the viewpoint of production.

With respect to the substrate to be employed for the diffraction element, a substrate of quartz glass, glass, silicon, polycarbonate or the like may be employed as a transparent substrate. Among these, a substrate of quartz glass or glass is preferred from a viewpoint of e.g. durability. Further, when the diffraction element is constituted as a reflection type diffraction element, it is preferred to apply a reflective coating comprising a metal or a multi-layer film on the diffraction grating, and a non-transparent substrate such as a crystallized glass or ceramics may also be employed besides the above transparent substrates.

In the following, under the assumption that the shape of the projecting portion is rectangular, the present invention will be described with reference to the drawings.

Figure 3:
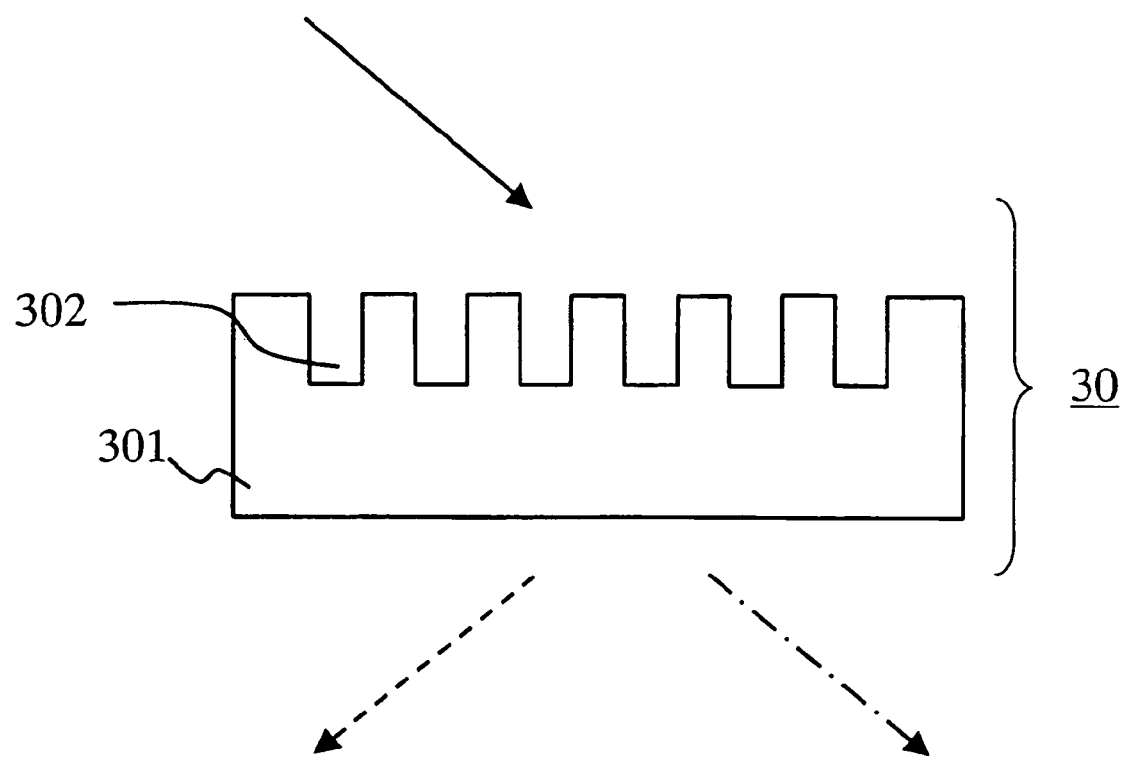
FIG. 3 is a side view showing another example of the construction of the diffraction element of the present invention.

FIG. 3 is a side view showing an example of the construction of the transmission type diffraction element of the present invention. On a transparent substrate 301, a rectangular diffraction grating 302 whose grating period is smaller than the wavelength of incident light, is formed by photolithography and dry etching methods to form a diffraction element 30. Light of wavelength $\lambda$ incident at an angle i to the direction of normal line to the diffraction grating (strictly speaking, in its longitudinal direction) having a grating period P, generates the m-th order diffraction light in a direction of diffraction angle $\theta$ defined by Formula 1. As evident from Formula 1, when the incident light is perpendicularly incident into the diffraction grating 302, no diffraction light is generated if the period of the diffraction grating is smaller than the wavelength. However, when the incident light is incident at a finite angle, namely, when the light is incident from an oblique direction, diffraction light having an order number can be present even if the period is smaller than the wavelength. Therefore, it is understandable that the diffraction grating shows an asymmetrical diffraction property even if the projecting portions has a symmetrical shape in the construction.

$$\sin(\theta)+\sin(i)=m\cdot\lambda/P \qquad \text{Formula 1}$$

Figure 4:
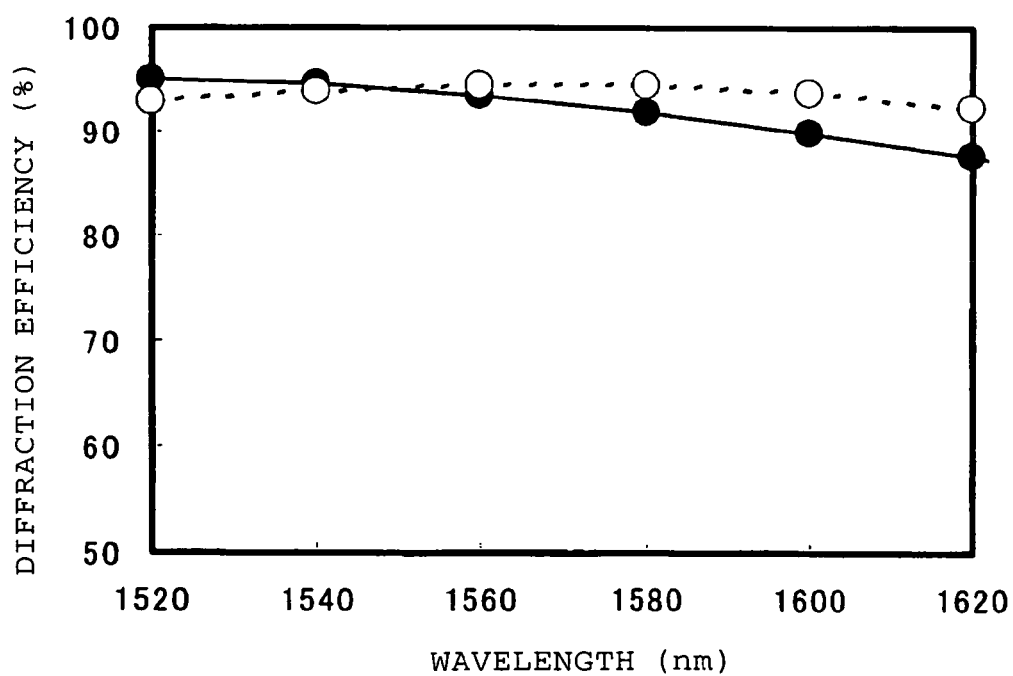
FIG. 4 is a graph showing an example of the difference of the diffraction property between cases of the presence and absence of a multilayer film on projecting portions in the diffraction element of the present invention.

By utilizing this effect by the oblique incidence, sufficiently high diffraction efficiency and large diffraction angle can be obtained even with a symmetrical rectangular diffraction grating which is easily producible. FIG. 4 shows, with a solid line connecting black dots, an example of wavelength dependence of the −1st diffraction efficiency calculated under the conditions that light is incident at an angle of about 50° to the normal line to a diffraction grating having a grating period of 1,000 nm (widths of a recessed portion and a projecting portion are each 500 nm) and a depth of about 2,300 nm. It is evident that within a range of from 1,520 nm to 1,620 nm which is longer than the grating period, with respect to linearly polarized incident light polarized in parallel with the grating, light intensity is concentrated on the −1st diffraction and thus the diffraction grating shows high diffraction efficiency.

In order to further improve the diffraction efficiency and to decrease the wavelength dependence, it is effective to form an appropriate multilayer structure on the projecting portions of the grating. FIG. 4 shows, with the broken line connecting white dots, the wavelength dependence of diffraction efficiency when a four-layered film comprising $TiO_2$ as a high-refractive index material and $SiO_2$ as a low-refractive index material is formed on the projecting portions. As evident from FIG. 4, high diffraction efficiency is uniformly obtained over the wavelength region.

Namely, the structure that at least one layer of optical material different from the projecting portions is laminated on the projecting portions, is preferred since it improves the diffraction efficiency. The optical material may, for example, be $Ta_2O_5$, $Al_2O_3$ or the like besides the above-mentioned $TiO_2$ and $SiO_2$.

Figure 5:
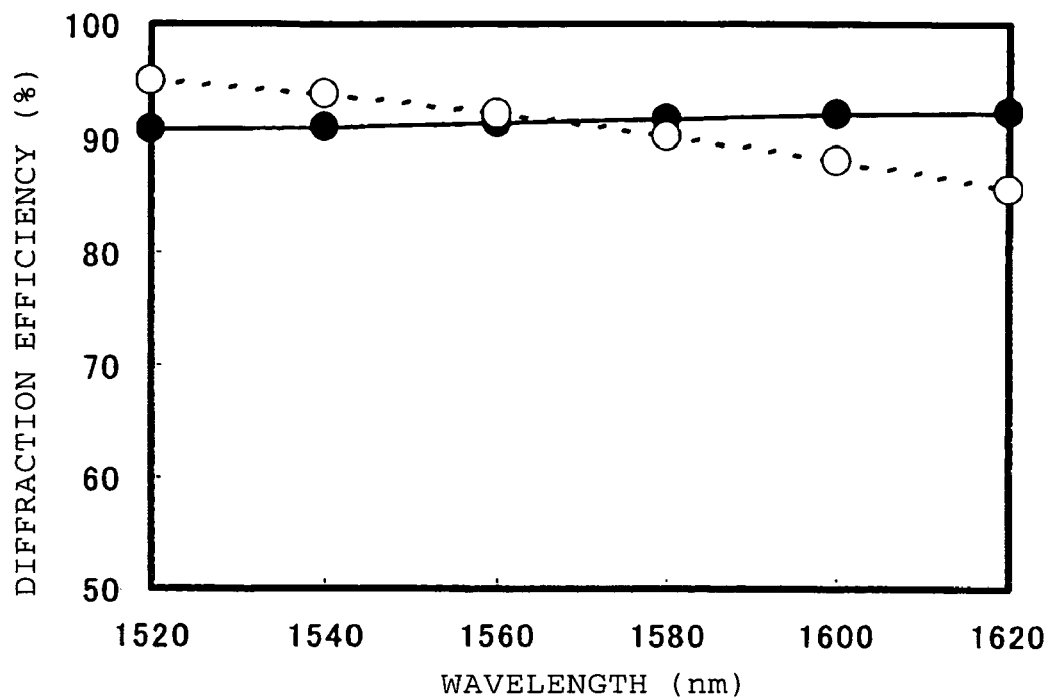
FIG. 5 is a graph showing an example of the diffraction property depending on the difference of polarization direction of incident light in the diffraction element of the present invention.

FIG. 5 shows another example of the wavelength dependence of diffraction efficiency in a case where light is incident at an angle of about 30° to a diffraction grating having a grating period of 1,500 nm and a grating depth of about 3,000 nm. In FIG. 5, the solid line connecting black dots shows the diffraction efficiency on linearly polarized light polarized in parallel with the grating, and the broken line connecting white dots shows the diffraction efficiency on linearly polarized light polarized perpendicularly to the grating. As evident from FIG. 5, the grating shows high diffraction efficiency to both of the polarized lights.

Figure 6:
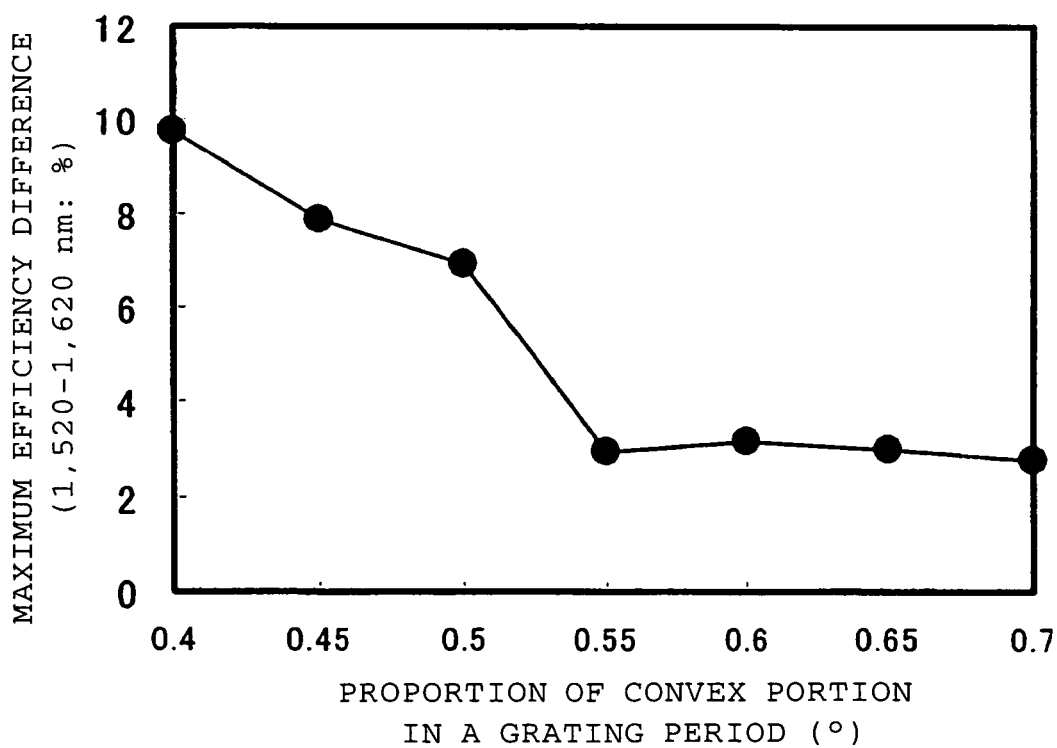
FIG. 6 is a graph showing an example of the diffraction property depending on the difference of the proportion of recessed portions to projecting portions in the diffraction element of the present invention.
Figure 7:
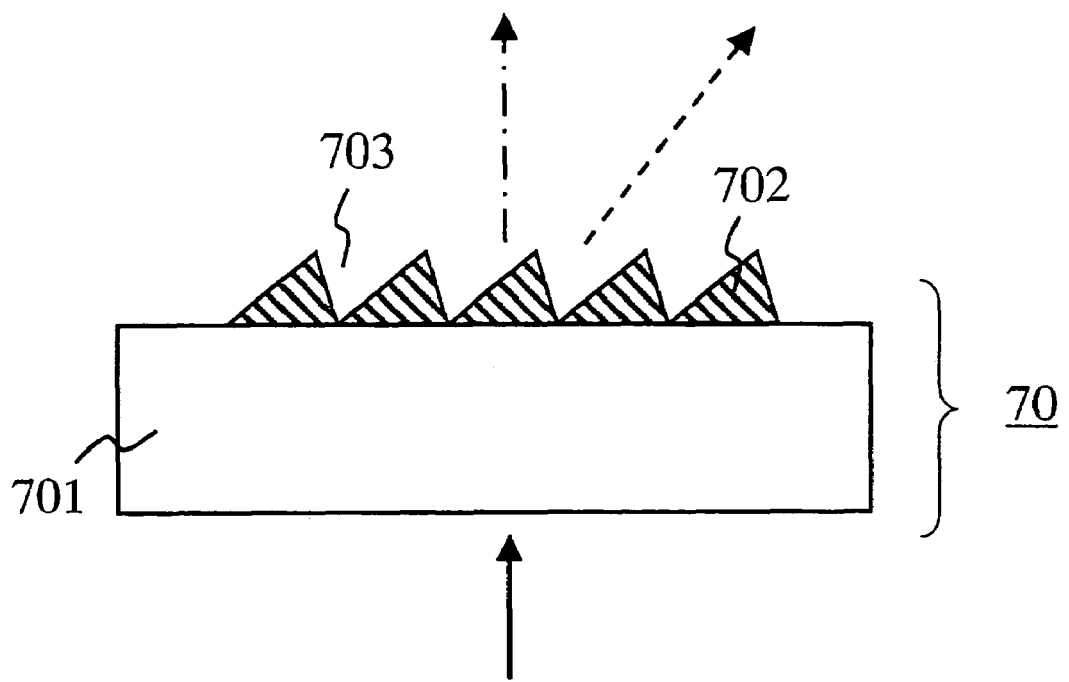
FIG. 7 is a side view showing an example of the construction of a conventional diffraction element.
Figure 8:
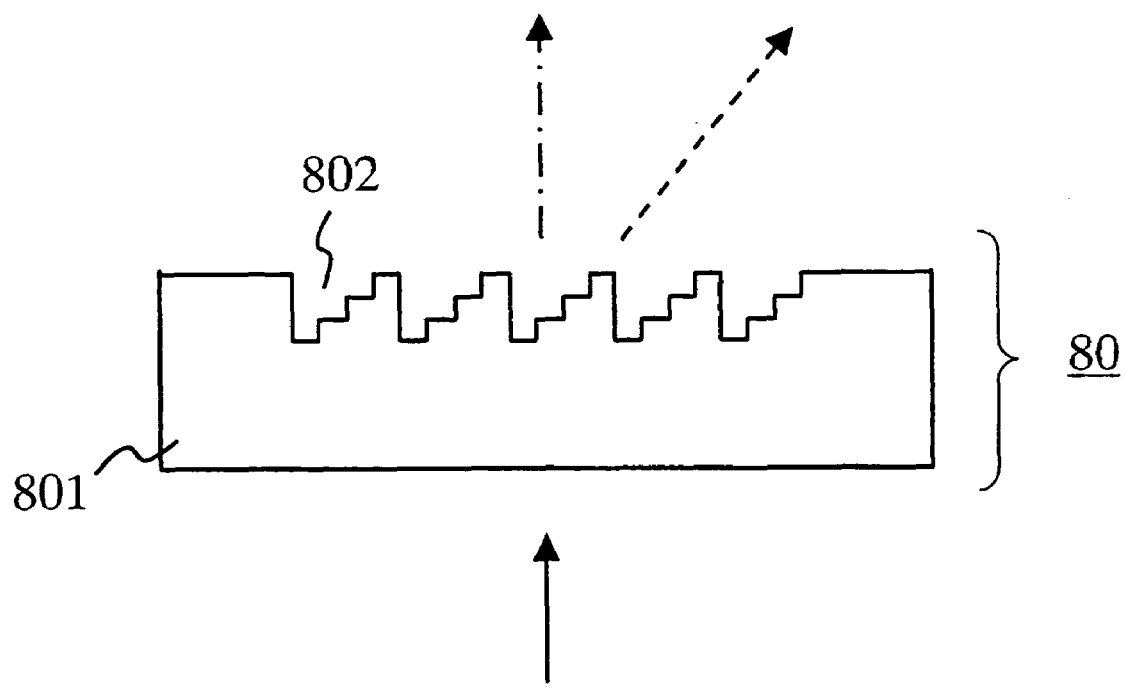
FIG. 8 is a side view showing another example of the construction of a conventional diffraction element.

In the example shown in FIG. 5, high diffraction efficiency is obtained with respect to both of the linearly polarized lights having polarization directions perpendicular to each other, but the difference between their diffraction efficiencies tends to be large as the wavelength becomes closer to 1,520 nm in the short wavelength region and 1,620 nm in the long wavelength region. In order to reduce the difference, it is effective to adjust the proportion of projecting portions to recessed portions forming the grating. FIG. 6 shows the difference between diffraction efficiencies of two polarized light polarized perpendicularly to each other within a wavelength range of from 1,520 nm to 1,620 nm, with respect to a diffraction grating whose grating depth is optimized for the proportion of the projecting portion in a period of the grating. As evident from FIG. 6, the difference between diffraction efficiencies of the two polarized light polarized perpendicularly to each other, can be significantly reduced when the proportion of projecting portion becomes larger than the half. Thus, by adjusting the proportion of projecting portion in a period, it is possible to constitute a diffraction grating having small polarization dependence on incident light.

Figure 13:
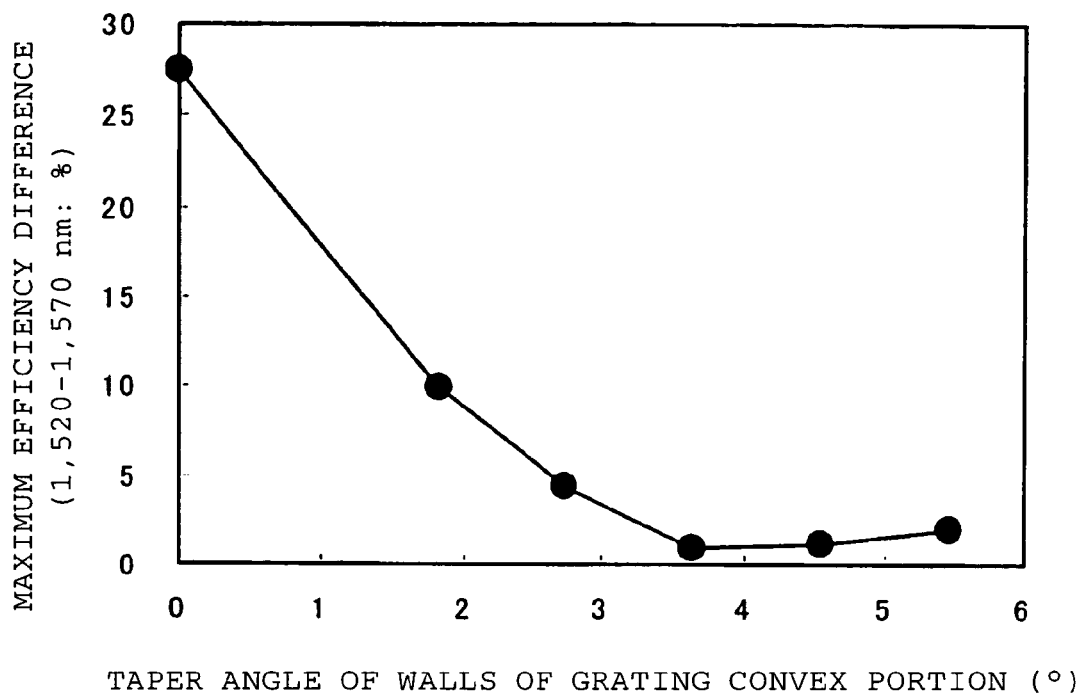
FIG. 13 is a graph showing an example of the diffraction property when the taper angle of wall surfaces of projecting portions of the grating is changed in the diffraction element of the present invention.

In order to reduce the difference between the diffraction efficiencies of linearly polarized lights polarized perpendicularly to each other, it is effective to maintain the proportion of the projecting portion forming the top of the grating to the recessed portion to be about 1 and to adjust the angle (hereinafter referred to as taper angle) of the wall surface of the projecting portion of the grating to the normal line of the substrate surface. FIG. 13 shows the difference between diffraction efficiencies of the two polarized lights polarized perpendicularly to each other within a wavelength range of from 1,520 nm to 1,570 nm, with respect to a diffraction grating having a grating period of 1,500 nm and a grating depth of 3,600 nm formed in the surface of a quartz glass substrate in the same manner as FIG. 6.

As evident from FIG. 13, the difference between diffraction efficiencies of the two polarized lights polarized perpendicularly to each other, is changed depending on the above-mentioned taper angle, and is significantly improved by making the taper angle to be at least 3°, preferably to about 4°. Thus, by adjusting the taper angle of the side wall of the grating, a diffraction grating having little dependency on polarization of incident light can be obtained.

By reducing the polarization dependence by these adjustments, variation of the diffraction property depending on the grating depth is also reduced, whereby the yield at a time of producing the grating is also increased.

Namely, in the proportion of the projecting portion to the recessed portion in a period of the diffraction grating, when the proportion of the projecting portion is larger than the proportion of the recessed portion, namely when the proportion of the projecting portion is at least 0.5, the difference between diffraction efficiencies of the two polarized lights polarized perpendicularly to each other can be reduced, such being preferred. Further, by inclining the wall surface forming the projecting portion of the diffraction grating and making the proportion of the projecting portion at the top of the diffraction grating in a period to be at most the proportion of the projecting portion forming the bottom of the grating, the difference between diffraction efficiencies of the two polarized lights polarized perpendicularly to each other, can be reduced, such being preferred.

Further, it is effective to improve the wavelength resolution by shortening the period of the diffraction grating to increase the change of the separation angle depending on the wavelength. However, if the grating period is shortened from 1,500 nm to 1,000 nm as in the above example, the difference of the diffraction efficiency by the polarization direction of incident light tends to be significant.

Therefore, even if the proportion of the projecting portion of the grating to the grating period is adjusted, the effect is not sufficient although a certain effect can be obtained. In order to reduce the difference of the diffraction efficiency due to the difference of polarization directions of incident light when the grating period is 1,000 nm, it is effective to employ a material having higher refractive index than the transparent substrate, as the material constituting the projecting portion of the grating formed on the transparent substrate.

Figure 10:
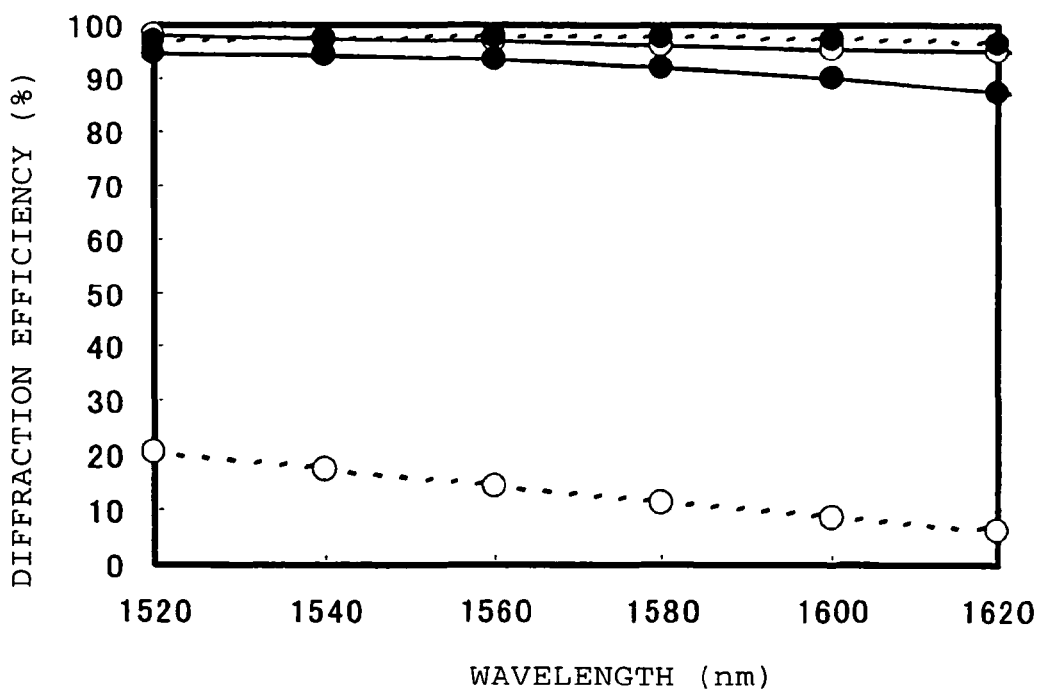
FIG. 10 is a graph showing an example of the diffraction property depending on the difference of polarization direction of incident light in the diffraction element of the present invention.

FIG. 10 shows the wavelength dependence of the diffraction efficiency to various polarization directions of incident light. The property in a case where the projecting portions and the recessed portions of the grating are formed on a quartz glass substrate so that the proportion between the projecting portions and the recessed portions are equal, is shown with white dots. In FIG. 10, a curve of solid line connecting white dots and a curve of dotted line connecting white dots show the properties of polarized lights polarized in directions in parallel with and perpendicular to the grating direction, namely, to the longitudinal direction of the grating respectively.

On the other hand, in FIG. 10, the property in a case where the projecting portion of grating formed on the transparent substrate is made of a material having a refractive index of about 2, is shown with black dots. In FIG. 10, a curve of solid line connecting black dots and a curve of dotted line connecting black dots show the properties to polarized lights polarized in parallel with and perpendicular to the grating direction respectively. As evident from FIG. 10, the difference of the diffraction efficiency due to the difference of polarization directions of incident light is reduced.

Figure 14:
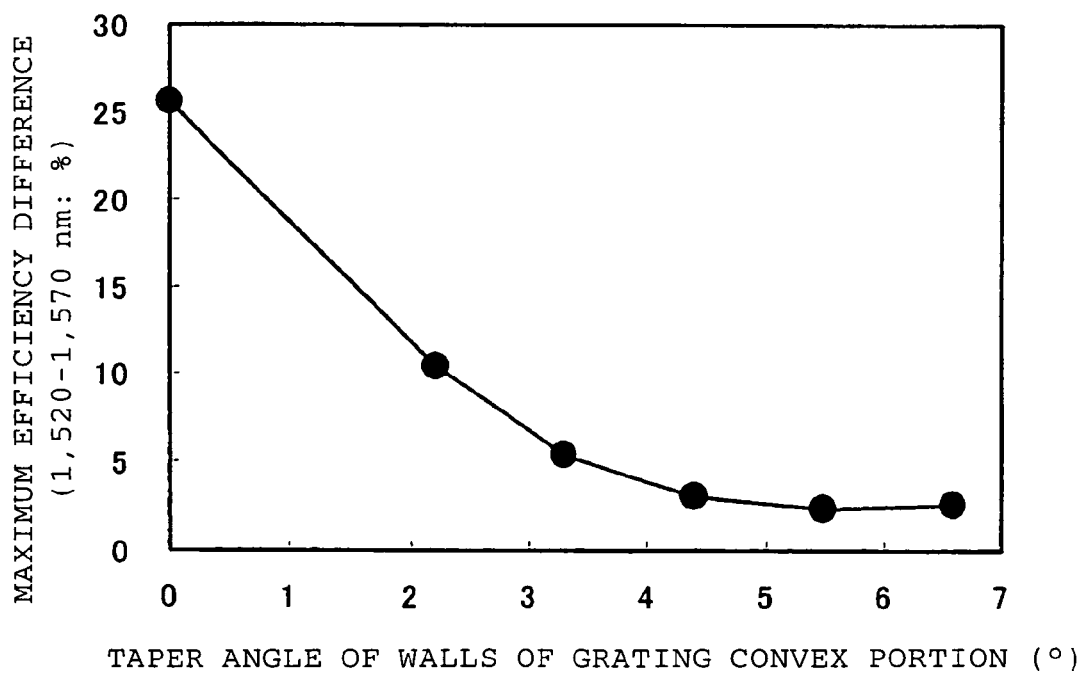
FIG. 14 is a graph showing another example of the diffraction property when the taper angle of wall surfaces of convex portions of the grating is changed in the diffraction element of the present invention.

In the same manner as the example shown in FIG. 13, even in a case where the projecting portions of grating formed on the transparent substrate are made of a material having a refractive index of about 2, it is possible to reduce the difference of the diffraction efficiency due to the difference of the polarization directions by adjusting the taper angle of the projecting portions of grating under the condition that the proportion of the projecting portions at the top of the grating to the recessed portions is maintained to be about 1. FIG. 14 shows the difference between the diffraction efficiencies of two polarized lights polarized perpendicularly to each other within a wavelength range of from 1,520 nm to 1,570 nm, with respect to a diffraction grating whose projecting portions formed on the transparent substrate are made of a material having a refractive index of about 2. As evident from FIG. 14, even in a case where the grating projecting portions are made of a material having a refractive index of about 2, the difference between diffraction efficiencies of two polarized lights polarized perpendicularly to each other is significantly improved by forming a taper angle of about 6°.

Further, from all of the above examples, it is understandable that high diffraction efficiency is obtained in a case where the incident light beam and a diffracted light beam are in a relation of approximately a mirror image to each other with respect to the grating plane of the transmission type diffraction grating, namely, in a case where the incident angle and the diffraction angle are approximately equal. Such an arrangement is called as Littrow arrangement, which is found in a transmission type diffraction grating in which incident light beam and a diffracted light beam overlap each other.

Further, in general, optical parts are coated with optical multi-layer films to reduce reflection at the interface. In a case of a diffraction grating having a large aspect ratio as in the above example, there are many problems such as deterioration of the shape due to the difference of deposition properties between the recessed portions and the projecting portions, and as a result, the coating of the optical multi-layer film decreases utilization efficiency of light in most cases. By forming a diffraction grating on a substrate on which a low reflection coating is applied, it is possible to improve the transmittance. In this construction, there is no low-reflective coating on the side and the bottom of the grating, but there is no deterioration in the shape of the grating and only the top of the grating is provided with the low-reflective coating.

By employing the construction of the present invention, a spectral diffraction grating having a large wavelength-separation effect and capable of obtaining high light-utilization efficiency can be realized, by a simple production process, as a transmission type diffraction grating capable of sufficiently separating incident light as diffraction lights. By this construction, a spectral diffraction element excellent in e.g. reliability and mass-productivity can be realized, and a low cost spectral system can be realized. Further, since such an element can be used in a transmission arrangement, there is a large flexibility in designing a spectral system.

The diffraction grating pattern in the diffraction element of the present invention, can be produced using e.g. a photomask. Accordingly, the diffraction grating pattern is not limited to a straight shape but it can be, for example, a curved shape. The curved diffraction grating pattern allows the addition of a lens function for converging diffraction light on a photodetector. Further, by employing a large area wafer process, an optical element having another function such as a phase plate can be laminated on the diffraction element, whereby higher functionality, complex system or the like can be achieved.

The optical element having another function to be laminated may, for example, be an optical element having a function of aperture limitation, aberration correction, lens function, beam shaping, polarization transformation, phase adjustment, intensity adjustment or the like. The optical element to be laminated is preferably one to which a large area wafer process can be applied such as a diffraction element, a liquid crystal element, a multi-layer film element or the like.

Namely, the construction that on one surface of the above diffraction element, another optical element is laminated and integrated, is preferred since the diffraction element is added with another optical function to realize high functionality.

The diffraction grating of the present invention is produced by processing, for example, a glass substrate as it is or an inorganic material film formed on the glass substrate. In particular, a grating formed by directly processing a glass substrate is preferred for the reasons that the film-forming process can be omitted and there is no interface between the formed film and the substrate. Namely, it is extremely preferred to directly process a quartz type glass substrate having etching properties of high rate and high uniformity. Further, from the viewpoints of reliability, mass-productivity and the like, a quartz type glass substrate is preferred.

Further, in order to reduce the change of the diffraction direction due to temperature change, control to the linear expansion coefficient of the substrate to be used is important, and it is preferred to employ a transparent substrate having an optimized linear expansion coefficient, in order to obtain an element excellent in thermal properties. In this case, the grating may be formed by directly processing the surface of a transparent substrate having an optimized linear expansion coefficient, or the grating may be formed in a processed layer made of an inorganic material excellent in etching properties, deposited on a transparent substrate having an optimized linear expansion coefficient.

As the glass substrate material whose linear expansion coefficient is optimized, a quartz glass doped with Ti, a glass containing e.g. $Al_2O_3$—$LiO_3$—$SiO_2$ as the main component or the like may be employed. Among these, a quartz glass doped with Ti unsusceptible to the thermal history of the substrate during the process and excellent in etching properties, is particularly preferred for the direct process.

Further, it is preferred that the surrounding area of the element is maintained unprocessed at a time of forming a grating having a large aspect ratio as in the above example, in order to prevent breakage of photoresist mask in the process or the grating material.

When the diffraction element of the present invention is a diffraction grating having a small period for improving wavelength resolution by particularly increasing the diffraction angle, the effect is remarkable. Particularly, when it is a diffraction grating whose period is approximately equal to the central wavelength or a diffraction grating whose period (pitch) is within a small range as compared with the central wavelength, the effect is significant.

Various optical devices are constituted by employing the above diffraction element of the present invention. Any optical device may be constituted so long as it uses the properties of the diffraction element of the present invention such as spectral properties.

Further, the construction that a transparent substrate is employed as the substrate of the above diffraction element and the diffraction element is used as a transmission type element to constitute a spectral device, is preferred since the diffraction element of the present invention has a large wavelength-separation effect and enables to increase the separation angle of transmission diffraction light to the incident light, whereby there is no limitation in the arrangement.

An example of the spectral device of the present invention is a detector for wavelength-multiplex communication employed for optical communication. When signal lights having different wavelengths from 1,520 nm to 1,620 nm are transmitted through a single transmission fiber, it is necessary to separate them into signal lights of different wavelengths and to measure the intensity of each of the signals. The lights output from the transmission fiber are diffracted and transmitted in different directions depending on the wavelength by the diffraction element of the present invention, and are incident into different photodetectors, whereby the signal intensities of the respective wavelengths can be measured. Moreover, since the transmission path is different depending on the wavelength, it is also possible to independently adjust the intensity or the phase of each of the wavelengths. In a case of employing a reflection type element, an arrangement called as Littrow arrangement is generally employed in which incident light and reflected diffraction light are close to each other, and there is a limitation in the arrangement of incident fiber and a detector. However, the transmission type diffraction element of the present invention is excellent in that there is little limitation in the arrangement since the angle between the incident light and the diffraction light is large while the diffraction element maintains a high utilization efficiency of light equivalent to the reflection Littrow arrangement.

Examples are shown below.

EXAMPLE 1

FIG. 1 is a side view showing the construction of the spectral diffraction element of this example. In this Example, a quartz glass of 2.0 mm thick was used as a transparent substrate 101, and an antireflective film 102 comprising four layers made of $TiO_2$ and $SiO_2$ was provided on a surface of the transparent substrate so that the reflectivity became minimum at an incident angle of 50°. Then, a diffraction grating of rectangular shape was formed by using photolithography and dry etching techniques. Namely, portions of the antireflective film corresponding to recessed portions of the grating were removed by etching first, and then, the quartz glass was etched to have an etching depth of 900 nm, whereby a rectangular diffraction element 103 having a grating period of 1,000 nm in which a multi-layer film was formed on the top of the projecting portions of the quartz glass, was obtained. The proportion of the widths of the recessed portion to the projecting portion was 1:1.

Then, on the surface of the transparent substrate 101 opposite from the surface on which the rectangular diffraction grating 103 was formed, an antireflective film 104 as a four-layer film for incident light of 50° was provided in the same manner as the above, and then, the transparent substrate 101 was cut into a rectangular shape of 15 mm×10 mm by a dicing saw to form a diffraction element 10.

When lights having wavelengths 1,520, 1,570 and 1,620 nm polarized in a direction in parallel with the grating were incident into the diffraction grating 10 from the side of the rectangular diffraction grating 103 at an external incident angle of 50°, the diffraction element 10 showed high diffraction efficiencies of 92, 93 and 91% respectively to the wavelengths. Further, the output directions of the diffraction light corresponding to the wavelengths of the incident light were 49, 54 and 59° respectively, and thus, three lights having different wavelengths can be sufficiently separated. In FIG. 1, an arrow mark of solid line shows incident light, an arrow mark of dashed line shows transmitted light and an arrow mark of broken line shows the −1st order diffraction light.

EXAMPLE 2

Figure 2:
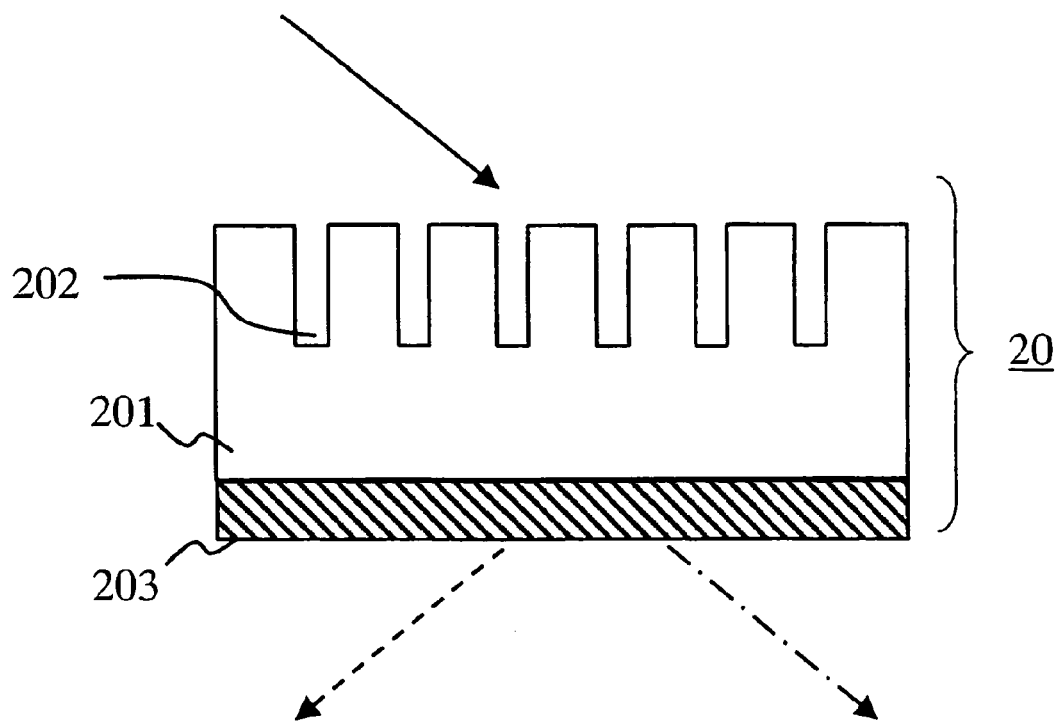
FIG. 2 is a side view showing another example of the construction of the diffraction element of the present invention.

FIG. 2 is a side view showing the construction of the spectral diffraction element of this example. In this Example, a quartz glass substrate of 2.0 mm thick was used as a transparent substrate 201. The transparent substrate 201 was coated with a photoresist, and a photolithography method was applied using a photomask, not shown, having opening portions with a size of ⅓ of the grating period, to form a photoresist mask in which the proportion of the width of the projecting portion to the recessed portion is 2:1. Then, by using a dry etching technique, a rectangular diffraction grating having a depth of 3,400 nm was formed. Namely, a rectangular diffraction grating 202 having a grating period of 1,500 nm, constituted by projecting portions of 1,000 nm wide and recessed portions of 500 nm wide, and made of a quartz glass having a grating depth of 3,600 nm, was formed.

Then, on the surface of the transparent substrate 201 opposite from the surface on which the rectangular diffraction grating 202 was formed, an antireflective film 203 adapted for incident light of 30° was provided. Then, the transparent substrate 201 was cut into a rectangular shape of 10 mm×6 mm by a dicing saw to form a diffraction element 20.

When lights having wavelengths 1,520, 1,570 and 1,620 nm were incident into the diffraction element 20 from the side of the rectangular diffraction grating 202 at an external incident angle of 30°, diffraction efficiencies to the wavelengths were 92, 92 and 92% respectively for polarized lights polarized in parallel with the grating. On the other hand, with respect to polarized lights polarized perpendicularly to the grating, they were 95, 92 and 89% respectively, and the diffraction element 20 showed high diffraction efficiency to either the change of the wavelength of incident light or the change of the polarization direction of the incident light. Further, the output directions of the diffracted lights corresponding to the wavelengths of the incident light were about 31, 33 and 35° respectively, and three lights having different wavelengths can be sufficiently separated. In FIG. 2, an arrow mark of solid line shows the incident light, an arrow mark of the dashed line shows the transmitted light and an arrow mark of broken line shows the 1st order diffraction light.

EXAMPLE 3

Figure 9:
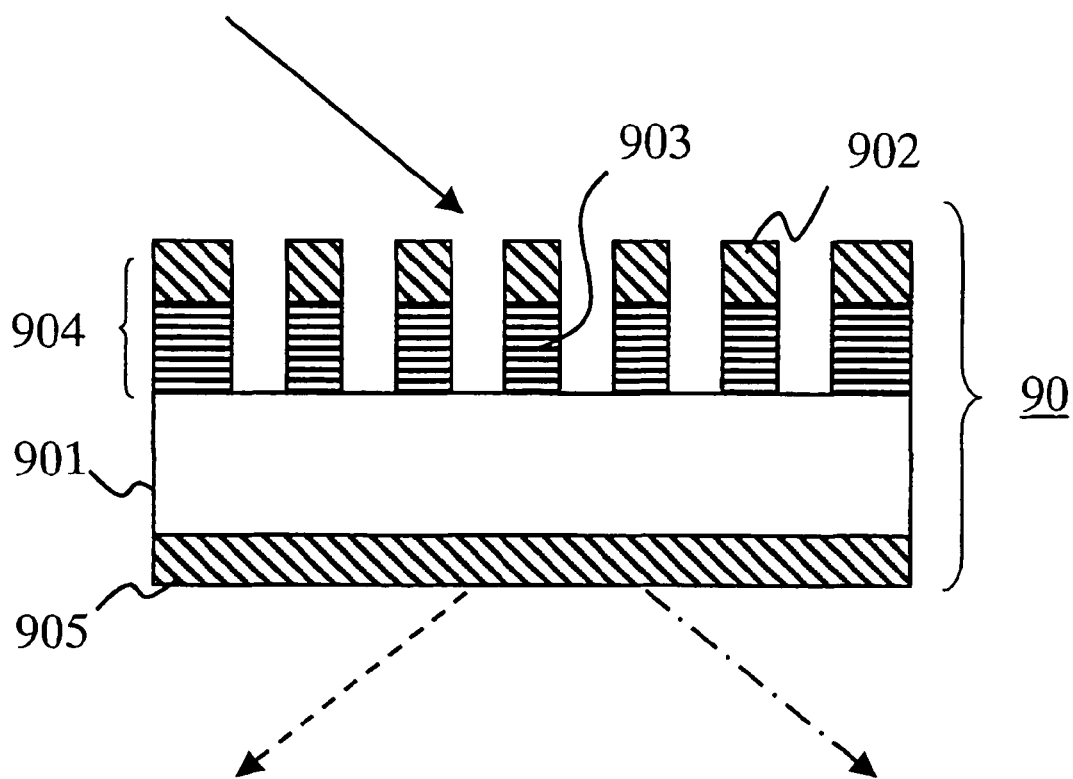
FIG. 9 is a side view showing another example of the construction of the diffraction element of the present invention.

FIG. 9 is a side view showing the construction of the spectral diffraction element of this example. In this Example, a colorless glass substrate of 2.0 mm thick was used as a transparent substrate 901 and a film of $Ta_2O_5$ of 1.3 μm thick and a film of $SiO_2$ of 0.35 μm thick were deposited on a surface of the transparent substrate by a sputtering method. Then, the films thus formed were selectively removed by using techniques of photolithography and dry etching to form a rectangular diffraction grating 904 comprising a $Ta_2O_5$ layer 903 and a $SiO_2$ layer 902. In this step, the proportion of the exposed portion to unexposed portion was adjusted by optimizing the opening of a photomask, not shown, to be used for the exposure, so that the proportion between the grating recessed and projecting portions in a grating period became 6:4, namely, the projecting portion became 600 nm and the recessed portion became 400 nm.

Then, on the other surface of the transparent substrate 901 opposite from the surface on which the rectangular diffraction grating 904 was formed, an antireflective film 905 for incident light of 50° was provided in the same manner as the above. Then, the transparent substrate 901 was cut into a rectangle of 15 mm×10 mm by a dicing saw to form a diffraction element 90.

When lights having wavelengths 1,520, 1,570 and 1,620 nm polarized in parallel with the grating were incident at an external incident angle of 50° to the diffraction element 90 from the side of the rectangular diffraction grating 904, the diffraction element 90 showed high diffraction efficiencies of 93, 94 and 92% with respect to the respective wavelengths. Further, with respect to lights of wavelengths 1,520, 1,570 and 1,620 nm polarized perpendicularly to the grating, the diffraction element 90 showed high diffraction efficiencies of 91, 92 and 91% respectively.

Further, the output directions of the diffracted lights were 49, 54 and 59° respectively depending on the wavelengths of the incident light, whereby light of three wavelengths can be sufficiently separated. In FIG. 9, an arrow mark of solid line shows the incident light, an arrow mark of dashed line shows the transmitted light and an arrow mark of broken line shows the −1st order diffraction light.

EXAMPLE 4

Figure 11:
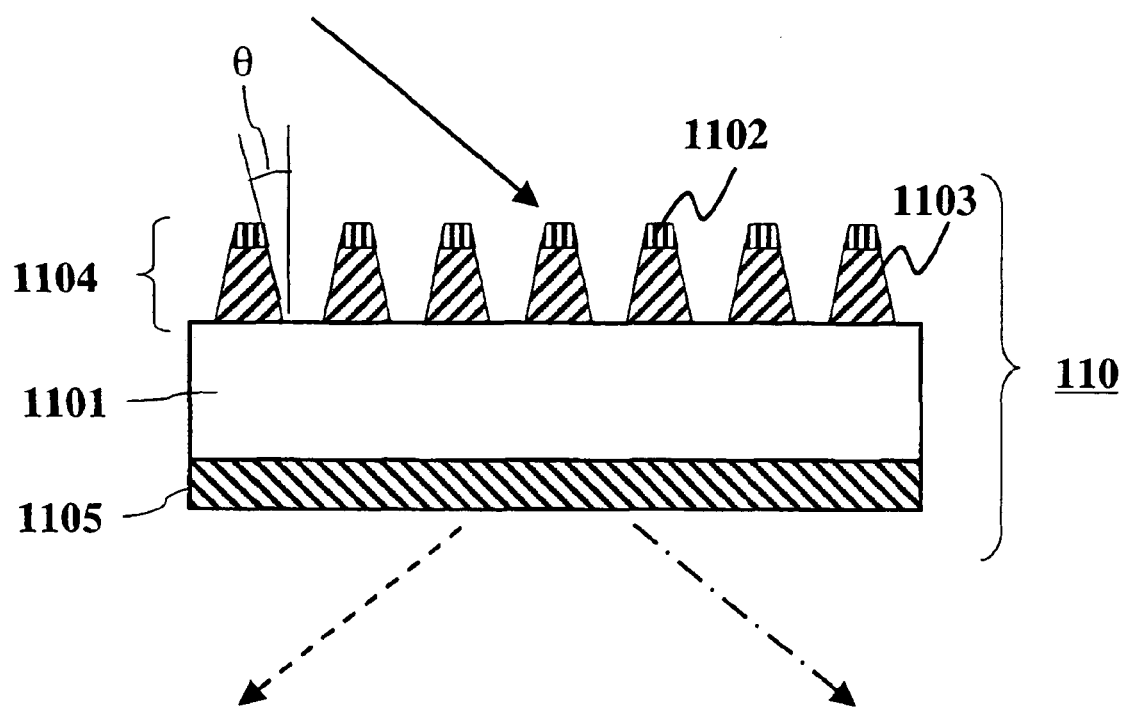
FIG. 11 is a side view showing another example of the construction of the diffraction element of the present invention.

FIG. 11 is a side view showing the construction of the spectral diffraction element of this example. In this Example, a quartz glass substrate of 2.0 mm thick was used as a transparent substrate 1101 and a film of $Ta_2O_5$ of 1,300 nm thick and a film of $SiO_2$ of 450 nm thick were deposited on a surface of the transparent substrate by a sputtering method. Then, the films thus formed were selectively removed by using techniques of photolithography and dry etching to form a diffraction grating 110 comprising a $Ta_2O_5$ layer 1103 and a $SiO_2$ layer 1102. In this step, wall surfaces forming the projecting portions of the grating were inclined by optimizing the opening of a photomask, not shown, to be used for the exposure and the etching conditions, whereby a tapered grating 1104 having a period of 1,000 nm was obtained. The proportion of the width of the projecting portion to the recessed portion at the grating top of the diffraction grating produced was approximately 1:1, and the taper angle of the wall surfaces of the grating projecting portions was about 6°. The proportion of the width of the convex portion to the concave portion at the grating top of the diffraction grating produced was approximately 1:1, and the taper angle of the wall surfaces of the grating convex portions was about 6°.

Then, on the surface of the transparent substrate 1101 opposite from the surface on which the diffraction grating 1104 was formed, an antireflective film 1105 for incident light of 50° was provided in the same manner as the above. Then, the transparent substrate was cut into a rectangle of 15 mm×10 mm by a dicing saw to form a diffraction element 110.

When lights having wavelengths 1,520, 1,545 and 1,570 nm polarized in parallel with the grating were incident at an external incident angle of 50° to the diffraction element 110 from the side of the rectangular diffraction grating 1104, the diffraction element 110 showed high diffraction efficiencies of 94, 95 and 95% with respect to the respective wavelengths. Further, with respect to lights having wavelengths 1,520, 1,545 and 1,570 nm polarized perpendicularly to the grating, the diffraction element 110 also showed high diffraction efficiencies of 95, 95 and 95% respectively.

EXAMPLE 5

Figure 12:
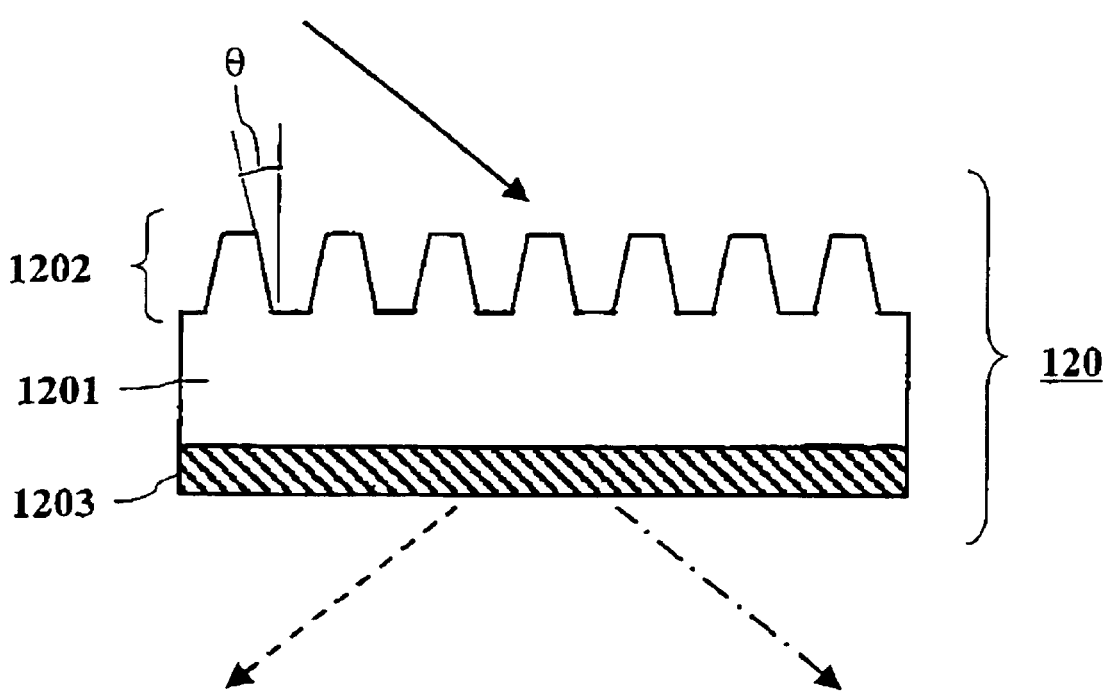
FIG. 12 is a side view showing another example of the construction of the diffraction element of the present invention.

FIG. 12 is a side view showing the construction of the spectral diffraction element of this example.

In this Example, a quartz glass substrate of 2.0 mm thick was used as a transparent substrate 1201. The transparent substrate 1201 was coated with a photoresist, and applied with a photolithography method using a photomask, not shown, to form a photoresist mask. Then, a diffraction grating 1202 having a depth of 3,600 nm and a grating period of 1,500 nm was formed by using a dry etching technique. In this step, the wall surfaces forming the projecting portions of the diffraction grating were inclined by optimizing the opening of the photomask, not shown, and the etching conditions, to form a tapered grating 1202. The proportion of the width of the projecting portion to the recessed portion at the grating top of the diffraction grating produced, was approximately 1:1, and the taper angle θ of the wall surfaces of the grating projecting portions was about 4°.

Then, on the surface of the transparent substrate 1201 opposite from the surface on which the diffraction grating 1202 was formed, an antireflective film 1203 for incident light of about 30° was provided. Then, the transparent substrate 1201 was cut into a rectangle of 10 mm×6 mm by a dicing saw to form a diffraction element 120.

When lights having wavelengths 1,520, 1,545 and 1,570 nm polarized in parallel with the grating were incident at an external incident angle of 30° to the diffraction element 120 from the side of the rectangular diffraction grating 1202, the diffraction element 120 showed high diffraction efficiencies of 95, 96 and 95% with respect to the respective wavelengths. Further, with respect to lights having wavelengths 1,520, 1,545 and 1,570 nm polarized perpendicularly to the grating, the diffraction element 120 also showed high diffraction efficiencies of 95, 95 and 94% respectively.

INDUSTRIAL APPLICABILITY

As described above, the diffraction element of the present invention functions as a spectral diffraction element having high diffraction efficiency and a large wavelength separation effect, which is excellent in mass-productivity by a simple process. Further, the diffraction element of the present invention realizes a diffraction element excellent in e.g. reliability and polarization properties.

This application is based upon and claims the benefit of priority under 35 U.S.C. § 120 from Application No. PCT/JP2004/003305, filed Mar. 12, 2004, and under 35 U.S.C. § 119 from Japanese Patent Application No. 2003-068214 filed on Mar. 13, 2003 and Japanese Patent Application No. 2003-078133 filed on Mar. 20, 2003 the entire contents of each of which including specifications, claims, drawings and summaries are incorporated herein by reference in their entireties.

What is claimed is:

1. A diffraction element comprising a grating formed in a substrate surface or a layer formed on a substrate, the grating having a recessed and projecting shape in cross section, the upper surface of a projecting portion being substantially flat and the projecting portion being symmetrical, wherein said projecting portion has a trapezoidal shape having a taper angle (θ) of from 3–6°, the grating of the diffraction element is formed with a period substantially equal to the wavelength of incident light, and the diffraction element is adapted so that light is incident obliquely to its surface where the grating are formed.

2. The diffraction element according to claim 1, wherein in the proportion of a projecting portion to a recessed portion in one period in the grating, the proportion of the projecting portion is equal to or larger than the proportion of the recessed portion.

3. The diffraction element according to claim 1, wherein the wall surfaces of the projecting portion of the grating are inclined, and the proportion of the upper end of the projecting portion of the grating in one period is equal to or smaller than the proportion of the bottom portion of the projecting portion.

4. The diffraction element according to claim 1, wherein at least one layer of an optical material different from the material for the projecting portion is laminated on at least the projecting portion.

5. The diffraction element according to claim 4, wherein the optical material is one selected from $TiO_2$, $SiO_2$, $Ta_2O_5$ or $Al_2O_3$.

6. The diffraction element according to claim 1, wherein a transparent substrate is used for the substrate; projecting portions of the grating are formed in a layer formed on the transparent substrate, and the projecting portions of the grating have a higher refractive index than the transparent substrate.

7. The diffraction element according to claim 6, wherein the layer formed on the transparent substrate is the layer comprising one selected from the group consisting of $SiO_2$, $TiO_2$, $Ta_2O_5$, $Si_3N_4$ and Si as the major component or a mixture thereof.

8. A diffraction element comprising another optical element laminated integrally on a surface of the diffraction element described in claim 1.

9. A method of use of a diffraction element which comprises a grating formed in a substrate surface or a layer formed on a substrate, the grating having a recessed and projecting shape in cross section, the upper surface of a projecting portion being substantially flat and the projecting portion being symmetrical, wherein said projecting portion has a trapezoidal shape having a taper angle (θ) of from 3–6°, the grating of the diffraction element is formed with a period substantially equal to the wavelength of incident light, the method being characterized in that light is incident obliquely to its surface where the grating is formed.

10. The method of use of a diffraction element according to claim 9, wherein the incident angle of obliquely incident light is in a range of from 15 to 80° with respect to the normal set on the surface of the diffraction element.

11. An optical device in which the diffraction element described in claim 1 is used.

12. A spectrometry device comprising the optical device described in claim 11, wherein a transparent substrate is used as the substrate of the diffraction element and the diffraction element is used as a transmission type element.

13. A method of spectrophotometry using a device according to claim 1, said method comprising measuring the intensity of wavelength in a spectrum of light.

14. A method of optical multiplex communication comprising sending and/or receiving light signals using a device according to claim 1.

15. The method of claim 9, wherein the method is used for spectrophotometry.

16. The method of claim 9, wherein the method is used for optical multiplex communication.

* * * * *